G. A. EDDY.
CHANGE GEAR OPERATING MECHANISM.
APPLICATION FILED JAN. 12, 1910.
1,002,503.
Patented Sept. 5, 1911.
3 SHEETS—SHEET 1.
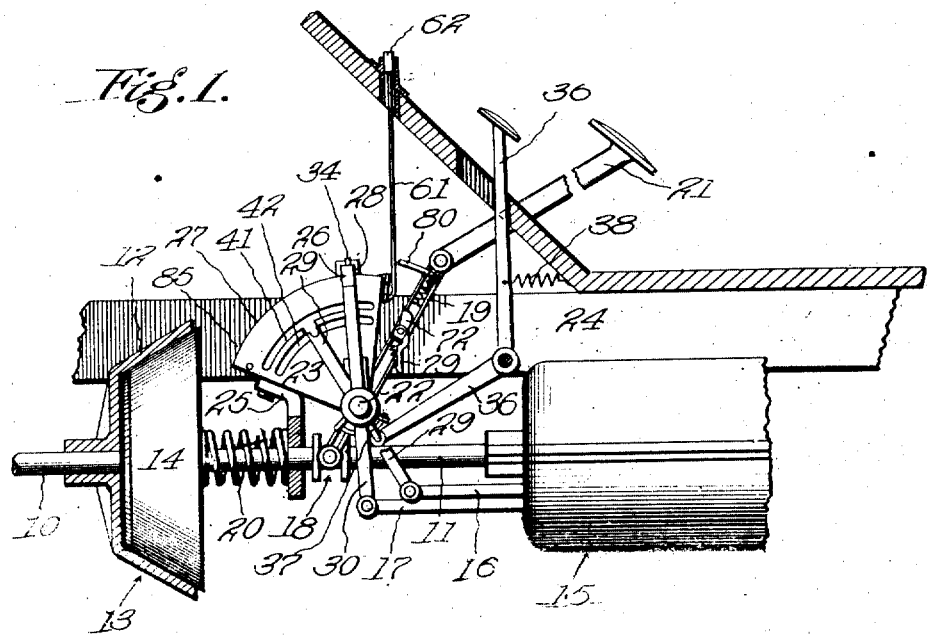
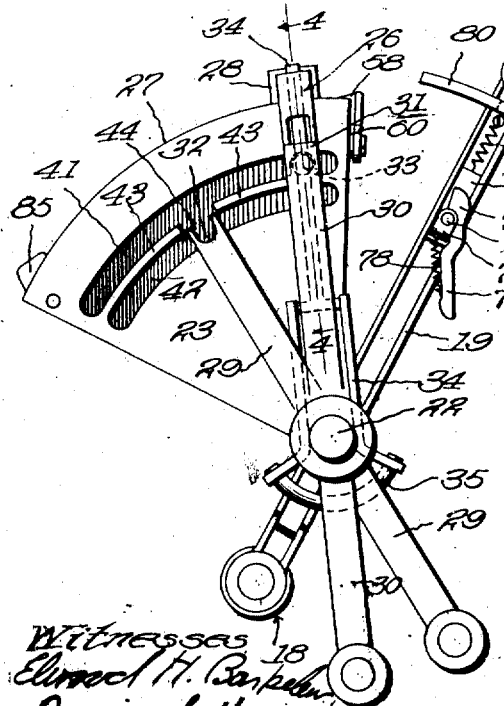
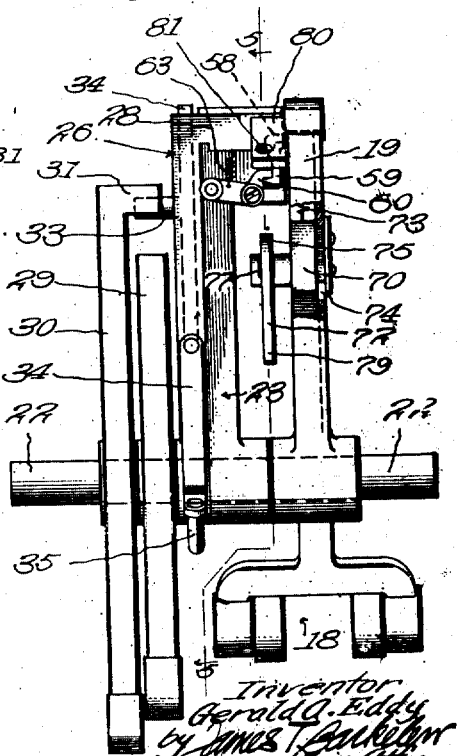

G. A. EDDY.
CHANGE GEAR OPERATING MECHANISM.
APPLICATION FILED JAN. 12, 1910.

1,002,503.

Patented Sept. 5, 1911
3 SHEETS—SHEET 2.

Witnesses
Inventor
Gerald A. Eddy
by his Atty.

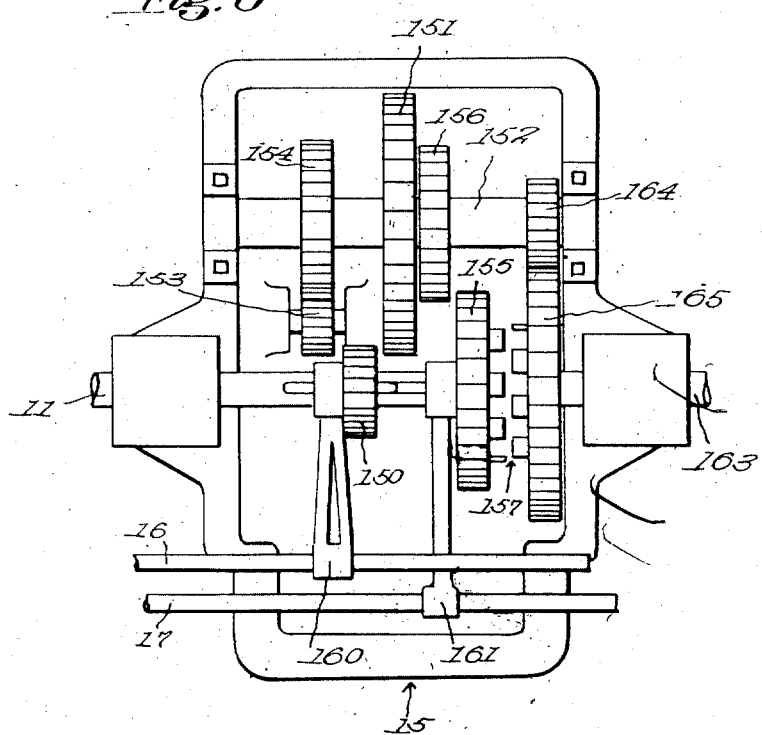

UNITED STATES PATENT OFFICE.

GERALD A. EDDY, OF LOS ANGELES, CALIFORNIA, ASSIGNOR OF ONE-HALF TO EDGAR BELK, OF LOS ANGELES, CALIFORNIA.

CHANGE-GEAR-OPERATING MECHANISM.

1,002,503.

Specification of Letters Patent.

Patented Sept. 5, 1911.

Application filed January 12, 1910. Serial No. 537,716.

*To all whom it may concern:*

Be it known that I, GERALD A. EDDY, a citizen of the United States, residing at Los Angeles, in the county of Los Angeles and State of California, have invented new and useful Improvements in Change-Gear-Operating Mechanisms, of which the following is a specification.

This invention relates to a mechanism adapted for shifting the gears in the change gear mechanism of an automobile and for simultaneously operating the clutch connecting the motor with the change gear mechanism.

One of the main objects of my invention consists in the direct connection of the clutch operating mechanism with the change gear mechanism in such a manner that the clutch is always disconnected while a change of gearing is in progress; and, secondarily, in the automatic releasing of this connection after the gears have been set, the gears remaining in their set position while the clutch is again closed.

Another of the objects is to provide means for normally locking the change gear mechanism in position, only to be unlocked after the clutch operating mechanism has been moved to open the clutch, a further movement unlocking and moving the change gear mechanism. Thus the clutch and gears are operated through the same means, but the clutch may be operated independently of the gears while the gears cannot be changed unless the clutch is first opened.

Other objects of minor importance will appear in the following description of the mechanism.

The preferred form of the mechanism as made at the present time broadly comprises a change gear lever which moves over a sector. A locking pin is provided on the lever and is normally spring pressed into apertures in the sector, thus locking the change gear lever in a stationary position. There are as many of these apertures as there are neccessary positions of the change gear lever. The clutch lever is normally independent of the change gear lever, only being connected to it through certain portions of its movement. The same locking pin which secures the change gear lever to the sector locks the change gear lever to the clutch lever, there being means on the clutch lever for forcing the pin out of the sector and into an aperture on the clutch lever when the clutch lever reaches the appropriate position traveling in one given direction.

Figure 4:
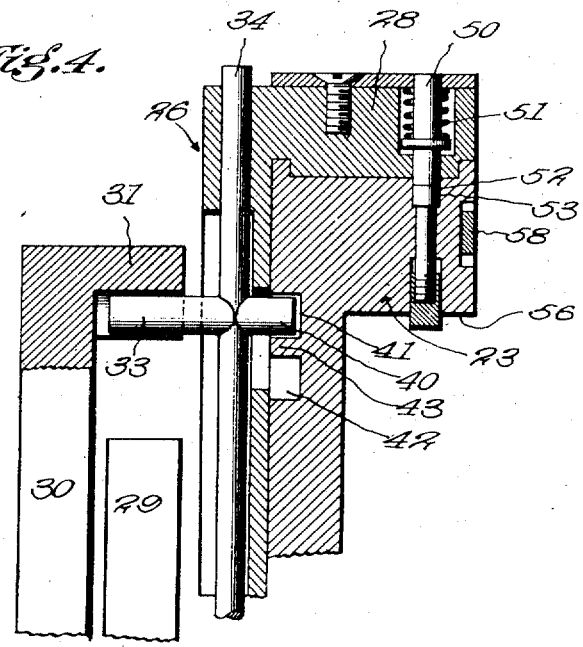
Figure 5:
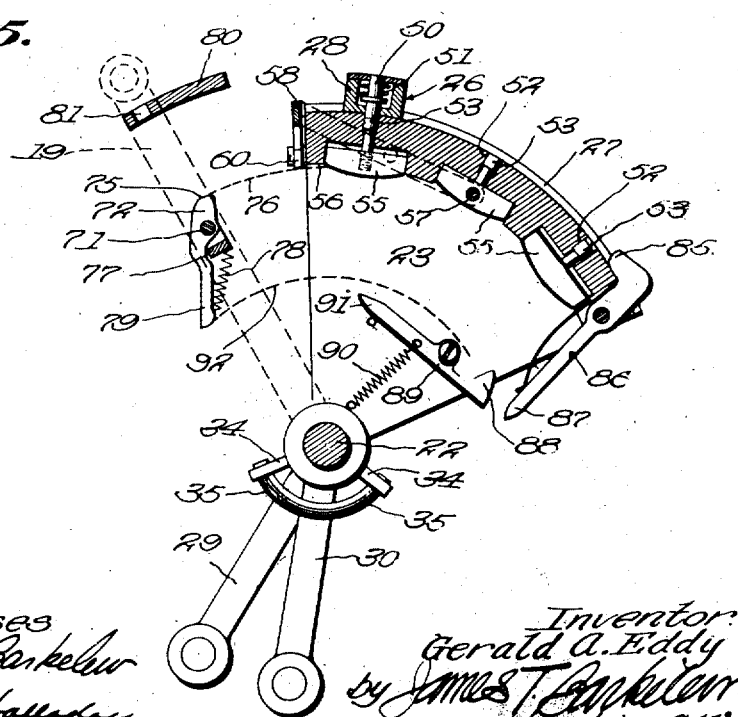

In the accompanying drawings, Figure 1 is an elevation showing the application of my improved mechanism to a motor car. Fig. 2 is an enlarged side elevation of the mechanism itself. Fig. 3 is an end elevation of the same. Fig. 4 is an enlarged cross section taken on line 4—4 of Fig. 2. Fig. 5 is a cross section taken on line 5—5 of Fig. 3. Fig. 6 is a view showing a typical set of transmission gears as operated by my mechanism.

In the drawings 10 designates the engine shaft of an automobile, carrying one member 12 of clutch 13. The other member 14 is carried by transmission shaft 11 passing to a transmission mechanism situated inside of casing 15 and consisting of a combination of change speed gears as illustrated in Fig. 6. Rods 16 and 17 operate the change speed gears in any of the usual manners, it being sufficient for the purposes of this specification to state that the arms are reciprocated to effect the desired end.

Connected with shaft 11 by a yoke and collar arrangement 18 at its lower end, is a lever 19, designated throughout this specification as the clutch lever. A spring 20 normally holds the lever in the position illustrated and also holds clutch 13 closed. The mechanism is so proportioned that a small movement of the upper end of the clutch lever toward the left from the position shown in Fig. 1 will open the clutch, breaking the driving connection between the engine and the transmission. Lever 19 is preferably operated by means of a foot pedal 21, this being the most convenient, but not the only method, of operating it. Lever 19 is mounted on a shaft 22 which is rigidly connected to a sector 23, either the sector or shaft, or both, being mounted upon underframing 24 of the automobile. In this case the sector is shown as supported by a bracket 25. Lever 19 is mounted on the shaft in such a position as to swing along one side of the sector. Adjacent the other side of the sector a second lever 26, hereinafter known as the change gear lever, is mounted on shaft 22. The upper curved surface 27 of sector 23 is grooved and a block 28, carried by the upper end of the change gear lever, oscillates in this groove.

Alongside of lever 26 are levers 29 and 30, one of these levers being shorter than the other and the longer one provided with a recessed overhanging end 31. The end of the shorter lever is also recessed as at 32, the recesses on both levers being for engagement with pin 33. Pin 33 is mounted on a rod 34 passing longitudinally along lever 26 and connecting at its inner or lower end with a yoke frame 34 which carries a curved member 35 on its lower end. This curved member is arranged concentrically around the center of shaft 22. Foot lever 36 is connected to member 35 by a link 37. A spring 38 holds the foot lever and connected mechanisms in the position shown. Mounted on rod 34 on the side opposite pin 33 is a pin 40 which is adapted to move in slots 41 and 42 on the face of the sector. These slots are separated by a wall 43 having an aperture 44 at its center, through which aperture pin 40 may pass from one slot to the other. If the pin is in the lower slot, spring 38 will normally force it into the upper slot upon passage of opening 44. If foot lever 36 is pressed toward the left in Fig. 1, the pin will be carried into the lower slot and kept there. The positions of the recessed ends of levers 29 and 30 are so arranged that when pin 40 rides in the upper slot, pin 33 will engage with the recessed end of lever 30; when pin 40 rides in the lower slot, pin 33 will engage with the recessed end of lever 29. Pin 33 always passes from engagement with one lever to engagement with the other at the point where it passes through wall 43, leaving the first lever always in a position opposite the central opening in the wall where it will be engaged by the pin upon its next passage through the wall. By this means it is provided that either of levers 29 and 30 may be moved in either direction at the will of the operator.

In Fig. 6 I have illustrated a change gear mechanism of typical design. The driving shaft 11 carries two sliding gears 150 and 155, movable through the medium of yokes 160 and 161 mounted on rods 16 and 17 respectively. These gears are adapted to mesh with gears 151 and 156 on the countershaft 152; gear 150 being also adapted to mesh with gear 153 driving gear 154 on the countershaft, this double gear drive providing for the reverse. The gears are of such relative diameters that the following described intermeshings will cause comparatively slow or medium speed of rotation of shaft 163. The high speed is provided for by the direct meshing of the halves of clutch 157, one half being mounted on gear 155 and the other on shaft 163. Countershaft 152 is connected to shaft 163 through intermeshing gears 164 and 165.

In the device as now made, and referring more particularly to Figs. 2 and 6, the movement of pin 40 to the left end of slot 42 will move lever 29 to a position to connect the "low" gears in the transmission; moving rod 16 to the right and meshing gears 150 and 151 on shaft 11 and countershaft 152, respectively; throwing the pin to the right hand end of this slot and thereby throwing lever 29 to the right, will throw in the "reverse," moving rod 16 to the left and meshing gears 150 and 153, gear 153 driving gear 154 on countershaft 152; allowing the pin to pass upwardly through the slot dividing wall into the right hand end of slot 41, and thereby moving lever 30 to the right, will throw in the "intermediate" gears, moving rod 17 to the left and meshing gears 155 and 156, on shafts 11 and 152 respectively; and moving the pin to the left hand end of slot 41, and thereby moving lever 30 to the left, will throw in the "high" gears, moving rod 17 to the right and engaging the two halves of clutch 157.

Block 28 on the end of lever 26 is provided with a locking pin 50 which is normally pressed toward sector 23 by a spring 51. The pin projects from either the lower or the upper side of the block, according to its position, being normally forced by the spring to project from the under side. The face of sector 23 is provided with a series of apertures 52 in the path of pin 50, the pin being normally forced into these apertures on its passage over them. In the present instance there are three of these apertures, one to hold the lever at each end of its movement and one to hold it in its central or "neutral" position. In each of these apertures is a loose pin 53, the pin normally lying in the position shown in Fig. 4. These pins are secured at their lower ends to contact members 55 having curved lower surfaces which project below the inner overhanging face 56 of the sector. By pressing upwardly on one of these contact members the pin can be forced to the position shown in the center of Fig. 5 and thus fill the aperture flush with the outer surface of the sector and prevent the entrance of pin 50 into the aperture or force the pin out if it be already inserted. Ordinarily it is not desired that pin 50 shall enter the central aperture and lock the lever in its neutral position. To prevent this from ordinarily taking place central contact member 55 is connected by pivot 57 to lever 58, this lever having a hook or catch 59 on its other end which is engaged by a hook 60 to hold it in such a position as to normally hold the central pin 53 in the position shown. When it is desired to allow the change gear lever to be locked in its neutral position it is only necessary to move hook 60 to disengage hook 59, when pin 50 can be forced by its spring into the central or neutral aperture. The movement of hook 60 is accomplished through a connecting rod 61 and a button 62, the button being conveniently mounted on the dash or floor of the automobile. Hook 60 is forced to its normal position, shown in Fig. 3, by a small spring 63 and is thus in readiness to engage with hook 59 whenever that hook is moved to the position shown in Fig. 3. This movement is accomplished by a device which will now be explained.

Mounted on the inside of lever 19 is a small slider block 70 which carries a pivot 71 on which a pawl 72 is mounted. A spring 73 pulls the slider block upwardly on lever 19, the upward movement being limited by the block passing through an aperture 74 in the lever and normally bearing against the upper end thereof. The parts are so arranged that the upper curved surface 75 of pawl 72 travels on the dotted lines 76 and strikes the lower faces of contact members 55 on its passage to the right in Fig. 5. A small bracket 77, which also supports the outer end of pivot 71, prevents the movement of the upper end of the pawl farther toward the left in Fig. 5 than the position shown; and a spring 78 resiliently allows its movement in the other direction. The lower end of the pawl is extended as at 79 for a purpose to be hereinafter described.

The action of the parts so far described is as follows; supposing the parts to be in the various positions shown in Fig. 5, lever 19 is moved toward the right at its upper end and the upper end of pawl 72 is forced into contact with left hand contact piece 55. This forces pin 53 upwardly to the top of its aperture and forces pin 50 out of that aperture. In the meantime a member 80 on lever 19 has passed over the upper and outer end of pin 50 and prevents the pin from being forced outwardly until aperture 81 reaches a position directly over the pin. The result is that, until the aperture reaches this position, pawl 72 is forced downwardly, extending spring 78, while contact piece 55 and pins 50 and 53 remain in their positions shown. When aperture 81 reaches its position over the pin spring 73 then forces pawl 72 and the pins upwardly, spring 73 being stronger than spring 51. The instant this is done, the change gear lever is connected and locked to the clutch lever so that the change gear lever will be carried with the clutch lever on its further movement to the right. When pin 50 reaches a position over right hand aperture 52, pin 53 will have been forced up to fill that aperture by the action of pawl 72 on contact member 55. Just as block 28 reaches this position it comes into contact with upper end 85 of a spring pressed lever 86, moving this lever so that its lower end 87 comes into contact with V shaped end 88 of lever 89. This lever is ordinarily held by spring 90 in the position shown. When block 28 strikes end 85 of lever 86 end 88 of lever 89 is forced downwardly and end 91 upwardly. At this time lower end 79 of pawl 72 is in a position somewhere above end 91, end 79 having described a path indicated by dotted line 92. End 79 will be struck by end 91 and will be thrown around toward the left. Contact surface 75 of the pawl is so shaped that when this occurs contact piece 55 will be allowed to be pressed down by spring 51 pressing pin 50 into aperture 52 against pin 53. Pin 50 will thus be allowed to enter aperture 52 and to leave aperture 81. The clutch lever may then be allowed to move back to its original position and thus allow the clutch to close. On the next movement of the clutch lever 19 to its extreme position toward the right pawl 72 will engage with contact piece 55 and press pin 50 out of aperture 52 in the manner before described. It is allowed to do this without interference from the end 91 of lever 89 as that lever is not actuated and is still in the position shown. When end of 87 of lever 86 is moved toward the left, it passes completely over V-shaped end 88 of lever 89, so that the lever 89 is allowed to assume its normal position after a momentary displacement. In passing back to its normal position, end 87 of lever 86 will again pass over V shaped end 88 of lever 89 and end 91 of that lever will again strike end 79 of pawl 72. But this action necessarily takes place as the pawl, clutch lever 19 and block 28 are moving toward the left and after the lever has picked up the block; for lever 86 cannot move until block 28 is moved. On the movement toward the left pawl 72 will not raise contact pieces 55 as it drags back over them. On this account pin 50 will pass into the first opened aperture it encounters, which will usually be the left hand one in Fig. 5. However, if hook 60 is released, the pin can be forced by spring 51 into middle aperture 52 and the change gear lever be locked in its neutral position. If this be the case, on the next movement of the clutch lever toward the right, central contact piece 55 will be forced upwardly and pin 50 will be forced out of aperture 52 and into aperture 81 so that the change gear lever is again locked to the clutch lever; but in the meantime hook 60 has sprung over hook 59 and thereafter holds pin 53 in a position to fill aperture 52 flush with the face of the sector so that the pin 50 can thereafter be moved in either direction over the central or neutral aperture without engaging therewith. Thus the function of pawl 72 is seen to be to unlock the change gear lever on a motion of the clutch lever in one direction only; while the function of levers 86 and 89 is to force the change gear lever to be dropped in its extreme right hand position in Fig. 5 when the change gear lever and clutch lever are moved to that position together, and to allow the clutch lever to pick up the change lever in the ordinary manner on the subsequent movement of the clutch lever alone to that position.

I do not limit myself to the above described details in so far as other mechanical equivalents can be used in their places. The invention consists mainly of those features set forth at the beginning of this specification, and only secondarily in the minor features particularly set forth in the latter part thereof.

I have shown and described a clutch and change gear mechanism as ordinarily employed in an automobile for the purpose for illustrating and describing my invention so as to render clear its construction and operation. But I am aware that constructions have been heretofore made for the general purpose of operating the change gear mechanism and the clutch in timed relation, there having been in use general inter-connecting means between the two mechanisms whereby the clutch is disconnected whenever the operating levers are moved to change the gearing connections in the transmission mechanism. For this reason I consider my invention to be restricted to my peculiar and distinctive form of mechanism for accomplishing these actions; but I do not thereby consider that my invention is of a limited character as generally understood. Following this idea I have restricted the claims to my distinctive mechanism in differentiation from claims which would cover the general combination of a clutch, a change gear mechanism and an interconnecting means whereby the mechanisms are coöperative; but I do not thereby mean to limit the scope of the claims to exactly the mechanical features and details hereinbefore set forth, intending to cover, within the limits stated all changes of form and design and omission of unessential parts.

Having described my invention, I claim:—

1. A mechanism of the character described, comprising a stationary frame, a manually operable member, a secondary mechanism adapted to be moved by the manually operable member, locking means on the secondary mechanism, locking means on the stationary frame and on the manually operable member each adapted to coöperate with the locking means on the secondary mechanism, and a lock actuating mechanism actuated by the movement of the manually operable member with relation to the frame.

2. A mechanism of the character described, comprising a stationary frame, a manually operable member mounted on the frame, a secondary mechanism adapted to be operated from the manually operable member, a locking member on the secondary mechanism, a locking member in the frame and the manually operable member respectively and adapted to each coöperate with the locking member on the secondary mechanism, and lock actuating means actuated by the movement of the manually operable member on the frame.

3. A mechanism of the character described, comprising a manually operable lever, a secondary lever, a locking pin on the secondary lever, a stationary member provided with an aperture for engagement by the locking pin, means to normally force the pin into the aperture, there being an aperture in the manually operable lever, and means on the manually operable lever to force the pin out of the aperture in the stationary member and into the aperture in the manually operable lever.

4. A mechanism of the character described, comprising a manually operable lever, a secondary lever, a locking pin on the secondary lever, a stationary member provided with an aperture for engagement by the locking pin, means to normally force the pin into the aperture, there being an aperture in the manually operable lever, and means on the manually operable lever to force the pin out of the aperture in the stationary member and into the aperture in the manually operable lever when the lever is moved in one direction.

5. A mechanism of the character described, comprising a manually operable lever, a secondary lever, a spring actuated locking pin on the secondary lever, a stationary sector over which the secondary lever travels, the sector having apertures into which the locking pin is spring pressed, pins in the sector apertures adapted to fill these apertures flush with the sector surface but normally lying below that surface, a member on the manually operable lever having an aperture for engagement by the locking pin, and means on the manually operable lever for moving the sector pins to completely fill the sector apertures.

6. A mechanism of the character described, comprising a stationary frame having an aperture therein, a manually operable member having an aperture therein, a secondary member, a locking pin on the secondary member adapted for entry into the apertures on the frame and the manually operable member, and means operated by the movement of the manually operable member, and means operated by the movement of the manually operable member to operate the locking pin.

7. A mechanism of the character described, comprising a stationary sector having a plurality of apertures in its periphery, a secondary lever having a block on its end adapted to travel over the periphery of the sector, a spring pressed pin in the block and adapted to enter the sector apertures, a manually operable lever, and means on the manually operable lever and actuated by the movements thereof to force the pin out of the sector apertures.

8. A mechanism of the character described, comprising a stationary sector having a plurality of apertures in its periphery, movable plugs for the apertures, a secondary lever having a block on its end and adapted to travel over the periphery of the sector, a spring pressed pin on the block and adapted to enter the sector apertures, a manually operable lever having an extension adapted to travel over the block and having an aperture therein for entry of the pin in the block, and means on the manually operable lever and actuated by the movement thereof to move the plugs in the apertures to force the pin out of the sector apertures and into the aperture in the extension on the manually operable lever.

9. A mechanism of the character described, comprising a stationary sector having a plurality of apertures in its periphery, movable plugs in the apertures, a secondary lever, a pin carried by the secondary lever and adapted to enter the sector apertures, means to normally press the pins into the apertures, a manually operable lever having an aperture adapted to receive the pin, and means mounted on the manually operable lever to engage with the movable plugs and force the pin out of the apertures on the movement of the manually operable lever in one direction.

In witness that I claim the foregoing I have hereunto subscribed my name this 4th day of January 1910.

GERALD A. EDDY.

Witnesses:
JAMES T. BARKELEW,
JAS. H. BALLAGH.